May 17, 1955 — A. M. DREFKE — 2,708,420
SANITARY TRAP NEST
Filed Feb. 3, 1954 — 2 Sheets-Sheet 1
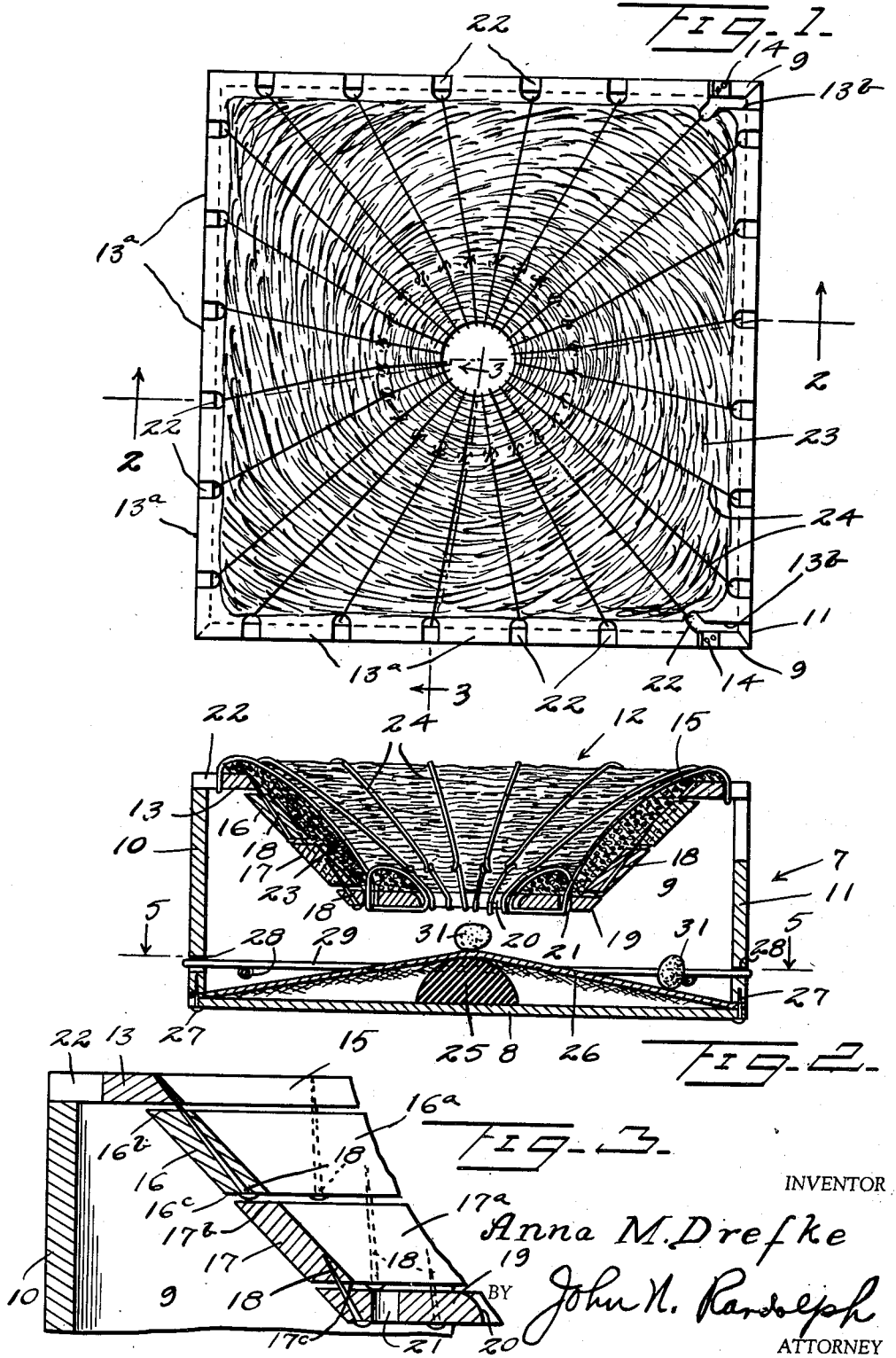
INVENTOR
Anna M. Drefke
BY John N. Randolph
ATTORNEY

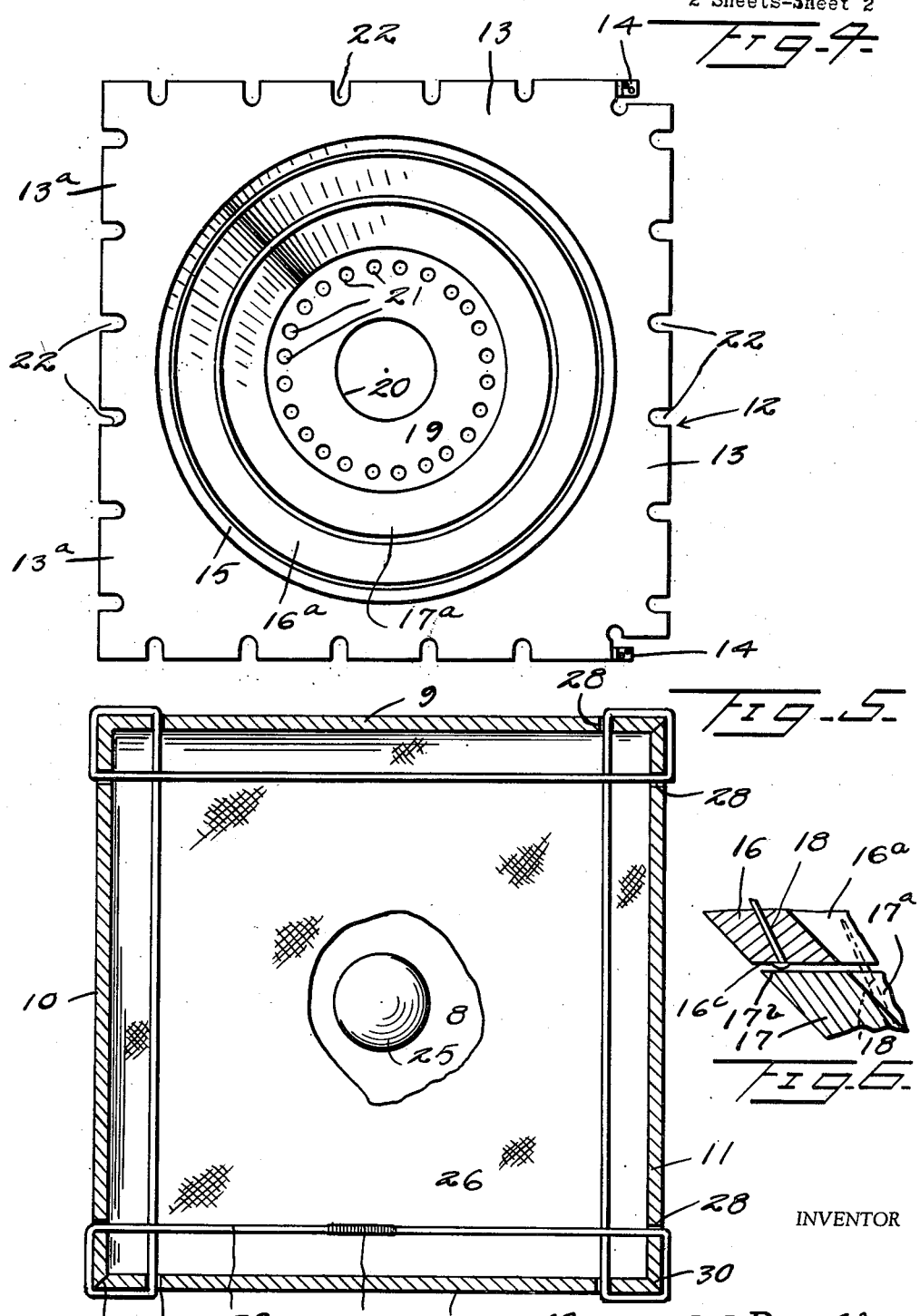

United States Patent Office 2,708,420
Patented May 17, 1955

2,708,420

SANITARY TRAP NEST

Anna M. Drefke, North Las Vegas, Nev.

Application February 3, 1954, Serial No. 407,960

6 Claims. (Cl. 119—48)

This invention relates to a sanitary hen's nest or laying nest and has for a primary object to provide a nest which will very realistically resemble an ordinary nest of straw fibers used by hens and wherein the nest proper constitutes a part of an egg collecting receptacle into which the eggs are discharged after being laid.

More particularly, it is an aim of the present invention to provide an improved hen's nest constituting a top wall of an egg collecting receptacle into which the eggs are discharged after being laid and directed to a position beneath the nest which is inaccessible to the hens to prevent the eggs from being soiled, broken, pecked or eaten by the hens and to permit the eggs to cool as soon as laid.

Another object of the invention is to provide an improved egg collecting receptacle including a hen's nest forming a top portion thereof from which the eggs can be readily removed and which receptacle is readily adapted to be placed in conventional laying boxes formed of wood or metal of the type commonly used by poultrymen.

Various other objects and advantages of the invention will hereinafter become more fully apparent from the following description of the drawings, illustrating a presently preferred embodiment thereof, and wherein:

Figure 1 is a top plan view of the hen's nest, constituting the top portion of an egg collecting receptacle;

Figure 2 is a sectional view of the hen's nest and receptacle, taken substantially along a plane as indicated by the line 2—2 of Figure 1;

Figure 3 is an enlarged fragmentary vertical sectional view of a portion of the receptacle and nest with certain of the parts of the nest omitted;

Figure 4 is a top plan view of the nest with certain of the parts thereof omitted;

Figure 5 is a horizontal sectional view of the egg collecting receptacle, taken substantially along a plane as indicated by the line 5—5 of Figure 2, and Figure 6 is an enlarged fragmentary sectional view of a portion of the hen's nest.

Referring more specifically to the drawings, the egg collecting receptacle in its entirety and comprising the invention is designated generally 7 and comprises a box-like structure which is preferably square, as illustrated in Figure 5, and which includes a bottom 8 and upstanding side walls 9, a front wall 10 and a rear wall 11. The walls 9, 10 and 11 are suitably joined to one another and to the bottom 8. As seen in Figure 2 the upper edge of the rear wall 11 is disposed substantially below the level of the upper edges of walls 9 and 10.

The top of the receptacle 7 is closed by a nest, designated generally 12, including a substantially flat top section 13 of substantially the same size as the bottom 8 and which is connected by hinges 14 to the upper edges of the walls 9 adjacent the rear wall 11. Said hinges being secured in recessed rear corners 13b of the member 13. Clearance is provided by the upper edge of rear wall 11 being disposed below the level of the axes of the hinges 14 for downward and inward swinging movement of the rear edge of member 13 when said member is swung to an open position. The marginal portions of the top member 13 normally rest upon the upper edges of the walls 9 and 10, by which the nest is normally supported, as illustrated in Figures 1, 2 and 3, in a position for substantially closing the top of the receptacle 7. Said top member 13 is provided with a relatively large central opening defined by the downwardly and inwardly inclined beveled annular surface 15. The nest 12 also includes two relatively wide annular wall members 16 and 17 having sloping inner and outer sides and beveled top and bottom edges. The sloping inner surfaces 16a and 17a of the members 16 and 17, respectively, are disposed beneath and substantially coplanar with the beveled surface 15 and combine therewith to form an annular downwardly and inwardly sloping surface. The uppermost wall member 16 is secured by a plurality of suitable spaced fastenings 18 to the top member 13 around the opening thereof so that the beveled top surface 16b of the wall member 16 is disposed beneath and substantially parallel to the bottom surface of the member 13. The wall members 16 and 17 are similarly secured by a plurality of the fastenings 18 and so that the bottom edge 16c of the wall member 16 is disposed above and substantially parallel to the top edge 17b of the wall member 17. The nest 12 also includes a substantially flat annular bottom 19 having an outer diameter of slightly less than the outer diameter of the restricted lower end of the wall member 17 and which is secured by additional fastenings 18 to said wall member 17 so that the upper surface of the bottom 19 is disposed beneath and substantially parallel to the beveled bottom edge 17c of the wall member 17.

The annular bottom 19 defines a relatively large central opening 20 in the bottom of the nest 12 having a diameter of substantially less than the diameter of the lower end of the inner wall surface 17a. The bottom 19 is also provided with a series of circumferentially spaced openings 21 disposed around the central bottom opening 20 and between said openings and the bottom edge 17c. Likewise, as best seen in Figures 1 and 4, the top member 13 is provided with a plurality of notches 22 opening outwardly of each edge thereof.

A portion of the upper side of the top member 13 located between the surface 15 and the notches 22, said surfaces 15, 16a and 17a and the upper sides of the nest bottom 19 are covered with a mass of fibers 23, preferably straw fibers, which form a lining for the nest 12 and which fibers are retained in position by one or more cords 24. The cord or cords 24 are laced through the openings 21 and through the central opening 20, as seen in Figure 2, to retain the straw fibers on the bottom 19 and extend between the openings 21 and the notches 22 on the inner side of the nest and over the straw fibers lining the inclined surfaces 15, 16a and 17a and the upper surface of the top member 13. Portions of the cord or cords pass along the underside of the top member 13 between the notches 22, so that looped portions of the cord or cords engage beneath and are anchored by alternate edge portions 13a of the top member 13 which are located between the notches 22. Other portions of the cord or cords 24 are similarly anchored by extending along the underside of the bottom 19 between alternate portions thereof which are located between the openings 21. However, the cord or cords 24 may be laced through the openings 20 and 21 and the notches 22 in any other suitable manner and anchored in any other manner desired to the top member 13 and bottom 19.

A member 25 of cushioning material such as soft rubber is secured to the central portion of the upper side of the bottom 8 directly beneath the nest opening 20. The cushioning member is preferably hemispherical and has its flat side disposed against the bottom 8. A piece of fabric 26 is disposed over the upper side of the bottom 8 and over the cushioning member 25 and is clamped between the bottom 8 and the bottom edges of the walls 9, 10 and 11 by fastenings 27 which secure the bottom to said walls and which extend through the fabric 26. Said walls 9, 10 and 11 near to but spaced from their ends and above and adjacent the bottom 8 are provided with openings 28 through which are laced a strand 29, as best illustrated in Figure 5. The strand 29 passes around the outer side of each corner 30 of the receptacle 7 and through the adjacent openings 28 so that portions of said strand are disposed within the receptacle 7 and spaced inwardly from and substantially parallel to the walls 9, 10 and 11. The ends of the strand 29 may be suitably joined as indicated at 29a.

From the foregoing it will be readily apparent that the receptacle 7 may be placed in any conventional laying box, not shown, and the nest 12 thereof will very realistically simulate or resemble an ordinary straw nest and will be readily used by laying hens. It will be readily apparent that as an egg is laid by a hen occupying the nest 12, said egg will roll down the upper surface of the nest 12 as defined by the mass of fibers 23 and through the central opening 20 onto the central portion of the fabric piece 26 which rests on the cushioning member 25 and which is disposed sufficiently below the nest 12 so that an egg 31 will clear the nest bottom 19 when it strikes the central portion of the fabric piece 26, as seen in Figure 2. The cushioning member 25 will cushion the impact of the egg 31 with the fabric piece 26. The fabric piece 26 slopes downwardly in all directions from its central portion so that each egg 31 after dropping onto the central portion thereof will roll by gravity toward one of the walls 9, 10 or 11 and as the egg approaches said wall it will strike a portion of the strand 29 which will function as a yieldable stop or bumper to prevent the egg from contacting the wall toward which it is rolling. Thus, each egg 31 as soon as it is laid will pass by gravity out of the nest 12 into a portion of the receptacle 7 disposed remote from the nest opening 20 so that the eggs cannot be soiled, pecked or broken by the hen and so that the eggs can commence to cool immediately after being laid. The nest 12 may be swung upwardly as a unit on its hinges 14 for removal of the eggs 31 from the bottom portion of the receptacle 7.

Various modifications and changes are contemplated and may obviously be resorted to, without departing from the spirit or scope of the invention as hereinafter defined by the appended claims.

I claim as my invention:

1. A sanitary hen's nest and egg collecting receptacle comprising a box-like structure forming a receptacle, a nest forming the top of the receptacle including a top member provided with an opening and a plurality of annular frusto-conical wall members connected to one another and to the underside of said top member, said top member having a downwardly and inwardly inclined annular surface defining the opening thereof, said wall members having downwardly and inwardly inclined inner surfaces disposed in coplanar relationship to one another and to said inclined surface of the top member, a substantially flat annular member secured to and disposed beneath the bottom frusto-conical wall member and forming the nest bottom, and means hingedly connecting the top member to walls of the box-like structure for swinging the nest upwardly to an open position.

2. A hen's nest and egg collecting receptacle as in claim 1, said nest bottom having a series of circumferentially spaced openings disposed between the central opening thereof and its periphery, said top member having spaced notches opening outwardly of its marginal edges, a mass of fibers lining the upper sides of said top member and bottom member and said inclined inner surfaces of the wall members, and tie means laced through the openings in the nest bottom and through the notches of said top member and having portions overlying said fiber mass.

3. A hen's nest and egg collecting receptacle as in claim 1, said box-like structure including a substantially flat bottom disposed beneath said nest, a cushioning member disposed on the central portion of the bottom of the box-like structure beneath and spaced from the central opening of the nest bottom and having a convex top portion, a piece of fabric having marginal portions secured to the bottom of said box-like structure remote from said cushioning member and having a central portion stretched over said cushioning member, said fabric piece providing a sloping surface inclined downwardly in all directions from the central portion thereof, and strand-like bumper means secured to the box-like structure and disposed over and adjacent portions of said fabric piece located remote from said cushioning member.

4. A hen's nest and egg collecting receptacle as in claim 3, and strand-like bumper means secured to the box-like structure and disposed over and adjacent portions of said fabric piece located remote from said cushioning member.

5. A hen's nest of the character described comprising a top member adapted to be hingedly connected to and normally supported on the open top of a box-like egg collecting receptacle said top member being substantially flat and having a relatively large central opening and a downwardly and inwardly inclined annular surface defining the wall of said opening, an annular downwardly tapered frusto-conical wall member disposed beneath the opening of said top member, means securing the upper end of said frusto-conical wall member to the underside of said top member around the opening thereof, said frusto-conical wall member having an annular downwardly and inwardly inclined inner surface disposed substantially coplanar with the inclined annular surface of said top member, an annular member forming the nest bottom having a central egg discharge opening spaced inwardly from said frusto-conical wall member, and means securing the outer portion of the nest bottom to the lower end of said frusto-conical wall member.

6. A hen's nest as in claim 5, a mass of fibers lining the inner and upper side of said nest, and tie means overlying said mass of fibers and anchored to said top member and to the nest bottom.

References Cited in the file of this patent

UNITED STATES PATENTS

| | | |
|---|---|---|
| 404,073 | Butterick | May 28, 1889 |
| 1,123,300 | Irwin | Jan. 5, 1915 |
| 1,329,963 | Faust | Feb. 3, 1920 |
| 1,728,700 | Purdy | Sept. 17, 1929 |

FOREIGN PATENTS

| | | |
|---|---|---|
| 101,987 | Australia | Sept. 6, 1937 |